US012650973B2

(12) United States Patent (10) Patent No.: US 12,650,973 B2

Bisegna et al. (45) Date of Patent: Jun. 9, 2026

(54) METHODS AND SYSTEMS FOR OVERTRUNCATION OF DATA LOGS

(71) Applicant: AMADEUS S.A.S., Biot (FR)

(72) Inventors: Tony Bisegna, Vallauris (FR); Reda Jebari, Villeneuve-loubet (DE); Jeremy Buchholtzer, Biot (FR); Jeremy Junac, Villeneuve Loubet (FR); Benjamin Rey, Antibes (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/887,625

(22) Filed: Sep. 17, 2024

(65) Prior Publication Data

US 2025/0110942 A1 Apr. 3, 2025

(30) Foreign Application Priority Data

Oct. 3, 2023 (EP) ..................................... 23306695

(51) Int. Cl.
*G06F 7/00* (2006.01)
*G06F 16/23* (2019.01)
*G06F 17/00* (2019.01)
*H04L 69/22* (2022.01)

(52) U.S. Cl.
CPC .......... *G06F 16/2358* (2019.01); *H04L 69/22* (2013.01)

(58) Field of Classification Search
None
See application file for complete search history.

(56) References Cited

U.S. PATENT DOCUMENTS

| | | | |
|---|---|---|---|
| 6,725,225 B1 | 4/2004 | Kori | |
| 2014/0279900 A1 | 9/2014 | Gupta et al. | |
| 2015/0365491 A1 * | 12/2015 | Chan .................. | H04N 21/4335 |
| | | | 709/219 |
| 2016/0050297 A1 * | 2/2016 | Koifman ................ | H04L 69/04 |
| | | | 707/693 |
| 2016/0162369 A1 * | 6/2016 | Ahn .................... | G06F 11/1461 |
| | | | 707/654 |
| 2017/0316028 A1 * | 11/2017 | Kanteti ................... | G06F 3/067 |
| 2023/0096637 A1 * | 3/2023 | Syed ........................ | G06F 3/061 |
| | | | 714/37 |

FOREIGN PATENT DOCUMENTS

EP 3438830 A1 2/2019

* cited by examiner

*Primary Examiner* — Tuan A Pham

(74) *Attorney, Agent, or Firm* — Perry + Currier Inc.

(57) ABSTRACT

A data logging method includes: obtaining a data record having an initial size; determining that the initial size exceeds a primary threshold; in response to determining that the initial size exceeds the primary threshold, generating a truncated data record by truncating the data record to a secondary size, wherein the secondary size is smaller than the primary threshold; and storing the truncated data record in a log repository.

14 Claims, 4 Drawing Sheets

300

METHODS AND SYSTEMS FOR OVERTRUNCATION OF DATA LOGS

CROSS-REFERENCE TO RELATED APPLICATIONS

This application claims priority from European patent application no. 23306695.0, filed Oct. 3, 2023, the contents of which is incorporated herein by reference.

FIELD

The specification relates generally to log data storage, and specifically to a method and system for overtruncation of data logs.

BACKGROUND

Logging data generated by software applications, communications between such applications, and the like, can be employed for diagnosing a wide variety of technical issues, usage audits, regulatory compliance, and the like. The storage space consumed by such data logging can incur significant costs, however.

SUMMARY

Examples disclosed herein provide a data logging method, comprising: obtaining a data record having an initial size; determining that the initial size exceeds a primary threshold; in response to determining that the initial size exceeds the primary threshold, generating a truncated data record by truncating the data record to a secondary size, wherein the secondary size is smaller than the primary threshold; and storing the truncated data record in a log repository.

In example embodiments, the data record includes a header and a payload; and wherein the secondary size is larger than the header.

In example embodiments, generating the truncated data record includes discarding a terminal portion of the data record extending beyond the secondary size.

In example embodiments, the secondary size is less than one half of the primary threshold.

In example embodiments, the method further comprises: obtaining a second data record having a second initial size; and in response to determining that the second initial size does not exceed the primary threshold, storing the second data record in the log repository.

In example embodiments, the method further comprises: prior to determining that the initial size exceeds a primary threshold, determining that the data record is not exempt from truncation.

In example embodiments, determining that the data record is not exempt from truncation includes: determining that at least one attribute of the data record fails to satisfy an exemption criterion.

Additional examples disclosed herein provide a computer-readable medium storing a plurality of computer-readable instructions executable by a processor of a computing device, to configure the computing device to perform the above method(s).

Further examples disclosed herein provide a computing device, comprising: a memory; a communications interface; and a processor configured to: obtain a data record having an initial size; determine that the initial size exceeds a primary threshold; in response to determining that the initial size exceeds the primary threshold, generate a truncated data record by truncating the data record to a secondary size, wherein the secondary size is smaller than the primary threshold; and store the truncated data record in a log repository.

In example embodiments, the data record includes a header and a payload; and wherein the secondary size is larger than the header.

In example embodiments, the processor is configured to generate the truncated data record by discarding a terminal portion of the data record extending beyond the secondary size.

In example embodiments, the secondary size is less than one half of the primary threshold.

In example embodiments, the processor is further configured to: obtain a second data record having a second initial size; and in response to determining that the second initial size does not exceed the primary threshold, store the second data record in the log repository.

In example embodiments, the processor is further configured to: prior to determining that the initial size exceeds a primary threshold, determine that the data record is not exempt from truncation.

In example embodiments, the processor is configured to determine that the data record is not exempt from truncation by: determining that at least one attribute of the data record fails to satisfy an exemption criterion.

BRIEF DESCRIPTIONS OF THE DRAWINGS

Embodiments are described with reference to the following figures.

DETAILED DESCRIPTION

Figure 1:
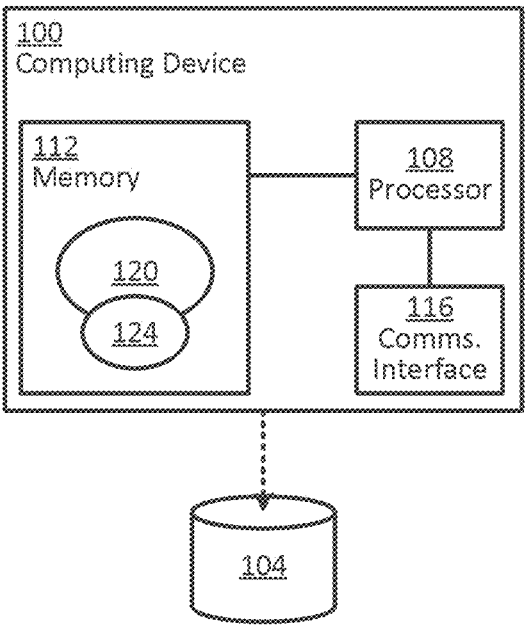
FIG. 1 is a diagram of a computing device.

FIG. 1 depicts a computing device 100 implementing data logging functionality. In general, the computing device 100 obtains data records from any of a wide variety of sources, and processes the data records for storage in a logging repository 104. The repository 104 may be maintained at the device 100, but is shown as a separate entity in FIG. 1, as the repository 104 may also be implemented by a distinct computing device, such as a cloud computing provider providing data storage services to the computing device 100. The data records obtained and processed for logging by the computing device 100 can also be processed for other purposes, whether by the computing device 100 itself or by other computing devices. The processing of the data records for logging can be performed in parallel to such other uses of the data records, in other words.

Certain internal components of the computing device 100 are shown in FIG. 1. In the illustrated example, the computing device 100 includes at least one processor 108, such as a central processing unit (CPU), graphics processing unit (GPU), or the like. The processor 108 is interconnected with a memory 112, implemented as a suitable non-transitory computer-readable medium, such as a combination of volatile and non-volatile memory components (e.g., any one or more of Random Access Memory (RAM), read only memory (ROM), Electrically Erasable Programmable Read Only Memory (EEPROM), flash memory, magnetic computer storage, and the like). The processor 108 and the memory 112 are generally comprised of one or more integrated circuits (ICs).

The processor 108 is also interconnected with a communications interface 116, which enables the computing device 100 to communicate with the other computing devices via suitable networks, e.g., including the device(s) hosting the repository 104. The communications interface 116 therefore includes any necessary components (e.g., network interface controllers (NICs), and the like) to communicate via such networks. The computing device 100 can also include input and output devices connected to the processor 108, such as keyboards, mice, displays, and the like (not shown). Such input and output devices may be deployed remotely from the computing device 100, e.g., at a distinct computing device operated as an administrative terminal for the computing device 100 and connected to the computing device 100 via the above-mentioned networks.

The components of the computing device 100 mentioned above can be deployed in a single enclosure, or in a distributed format. In some examples, therefore, the computing device 100 includes a plurality of processors 108, either sharing the memory 112 and communications interface 116, or each having distinct associated memories and communications interfaces.

The memory 112 stores a plurality of computer-readable programming instructions, executable by the processor 108. The instructions stored in the memory 112 include a primary data handling application 120, and a logging application 124. Each of the applications 120 and 124 is executable by the processor 108 to implement certain functionality. The computing device 100 is therefore said to be configured to perform that functionality, and it will be understood that the computing device 100 is so configured via execution of the corresponding application.

The primary application 120 can include any of a wide variety of applications, including for example a computer reservation system (CRS), or an application implementing a component of a CRS. The application 120 generates and/or manipulates data records, such as passenger name records (PNRs), e.g., used to represent travel-related reservations such as flight tickets, hotel reservations, and the like. In other examples, the application 120 can implement other travel-related functions, such as a departure control system (DCS) or component thereof. In further examples, the application 120 can implement any of a variety of other functions, such as a messaging server (e.g., an email server), a web server, or the like. The nature of the records generated and processed via the execution of the application 120 can vary with the nature of the functionality implemented by the application 120.

The logging application 124 can configure the computing device 100 to capture, retrieve, or otherwise obtain data records generated or otherwise processed by the application 120, for logging in the repository 104. The data records can therefore include messages exchanged with other computing devices via execution of the application 120, the results of processing of such messages at the computing device 100, and the like. The logging application 124 can be implemented as a plugin for the application 120, in some examples. In other examples, the logging application 124 can be integrated as a component of the application 120 rather than implemented as a standalone application or a plugin, as illustrated. As will also be apparent, the application 120 need not be resident at the computing device 100. That is, in some examples, the computing device 100 can implement logging functionality for one or more applications (such as the application 120) that are executed at a different computing device. The computing device 100 can, for example, receive data records (e.g., copies of messages, files, and the like) via the communications interface 116, and execute the application 124 to process those data records for logging in the repository 104.

Data records logged in the repository 104 can be used to diagnose a wide variety of problems, from communications errors to customer complaints (e.g., in the case of travel-related records such as PNRs). The logging of data records can consume a significant amount of storage space, however. For example, the repository 104 may receive hundreds of thousands, or millions, of records for logging on a daily basis. The cost of maintaining the repository 104, e.g., in the form of payment to a third-party cloud computing operator, and/or staff and hardware maintenance, may therefore be significant.

Figure 2:
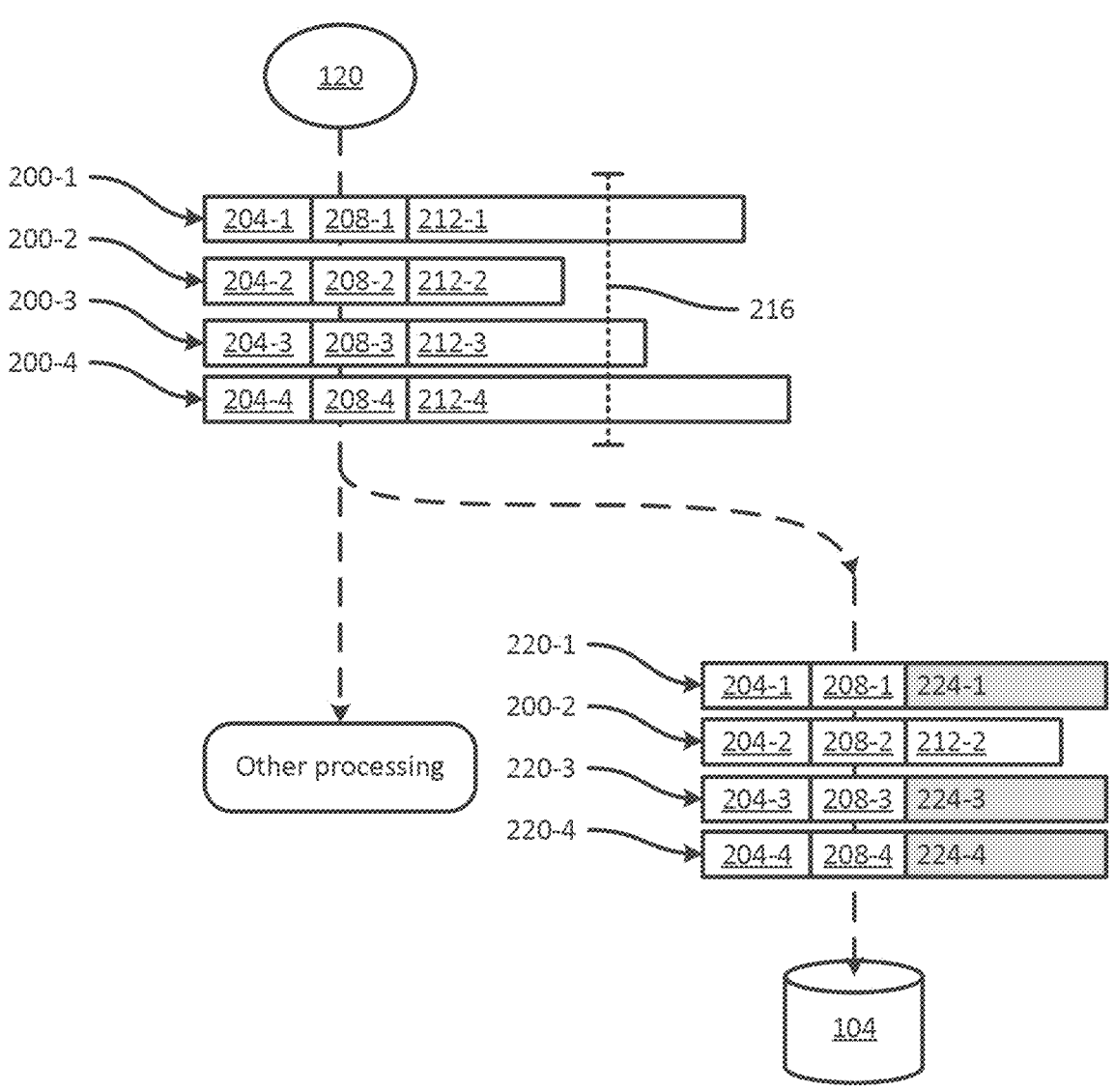
FIG. 2 is a diagram illustrating a data record truncation mechanism.

To mitigate the costs of maintaining logs, logged data records may be truncated prior to storage in the repository 104. FIG. 2 illustrates a previous approach to truncation of data records for logging purposes. As shown in FIG. 2, the application 120 may generate a plurality of data records 200-1, 200-2, 200-3, and 200-4 (collectively referred to as the data records 200, and generically referred to as a data record 200; similar nomenclature is used elsewhere herein). The data records 200 can include, for example, messages containing newly created PNRs, updates to existing PNRs, or the like. It will be understood that the data records 200 can also contain any of a wide variety of other information, including emails or other messages, application-level events, execution traces, and the like.

In the illustrated example, each data record 200 includes a header 204 (thus, headers 204-1, 204-2, 204-3, and 204-4 are illustrated) containing addressing information (e.g., identifying an originating computing device and a destination computing device) and/or metadata (e.g., a timestamp indicating when the data record 200 was generated or the like). Each data record 200 also includes a message body 208, e.g., containing application programming interface (API) commands, or the like. The message bodies 208-1, 208-2, 208-3, and 208-4 may specify whether the corresponding data records represent new PNRs, commands to delete PNRs, updates to PNRs, or the like. The data records 200 also include, in this example, respective payloads 212-2, 212-2, 212-3, and 212-4, which may contain the PNR data itself. As will be apparent, the data records logged in the repository 104 can also have various other structures, and thus in some examples may omit either or both of the bodies 208 and payloads 212, or may combine the headers 204 with other elements of the records 200, and the like. In general, the data records 200 are likely to include metadata at or near the beginning of the records 200, and any payload data or other information is likely to appear after the metadata, in a terminal portion of the records 200.

To reduce the storage impact of logging the records 200, some logging functions truncate the records prior to logging. For example, some logging functions compare the size of each record 200 (indicated in FIG. 2 by the total length of each record 200) to a truncation threshold 216. Any portion of a record 200 that extends beyond the truncation threshold 216 is discarded, and only the initial portion of the record (up to the truncation threshold 216) is logged. For example, as shown in FIG. 2, while the record 200-2 is logged in full because it is smaller than the truncation threshold 216, the records 200-1, 200-3, and 200-4, are truncated. That is, truncated records 220-1, 220-3, and 220-4 are stored in the repository 104 in place of the records 200-1, 200-3, and 200-4.

The truncated records 220 include the original headers 204 and bodies 208 of the corresponding records, but include only partial versions 224 of the payloads 212, omitting terminal portions of the records 200 that extend beyond the truncation threshold 216. The partial payloads 224, or more generally, a partial version of any data record or portion thereof, may still be usable for some debugging, diagnosis, or other functions performed using log data, but may no longer be usable for certain functions. For example, in the absence of a complete version of a PNR in the repository 104, diagnosing the source of an incorrect travel reservation represented by the PNR may be difficult or impossible. Thus, the range of diagnosis or other downstream processing activities that can be performed using the truncated records 220 may be limited to activities that use only the headers 204 and bodies 208.

The truncation of certain data records 200 may, in other words, reduce logging storage requirements but also reduce the value of some stored data for downstream processes. The partial payloads 224 may, for example, have little or no logging value. As discussed below, the logging application 124 therefore uses two distinct record sizes for the decision to truncate and the actual truncation operation. In general, the logging application 124 configures the computing device 100 to compare data records to a primary threshold such as the threshold 216 (e.g., 64 kilobytes (KB) in some examples) to determine whether to truncate the data records. The logging application 124 further configures the computing device 100 to truncate any records exceeding the primary threshold to a secondary size, smaller than the primary threshold. This may be referred to as "overtruncation". In contrast to the implementation shown in FIG. 2, overtruncation by the logging application 124 enables a further reduction in log size, e.g., compared to the truncated records 220, while mitigating the impact of such further reduction on the utility of the logged data for diagnosis and the like. That is, the overtruncation described herein "sacrifices" additional portions of the payloads 212, but given that any truncation of the payloads 212 may prevent certain downstream functions, little downstream functionality is lost by truncating additional payload data.

Figure 3:
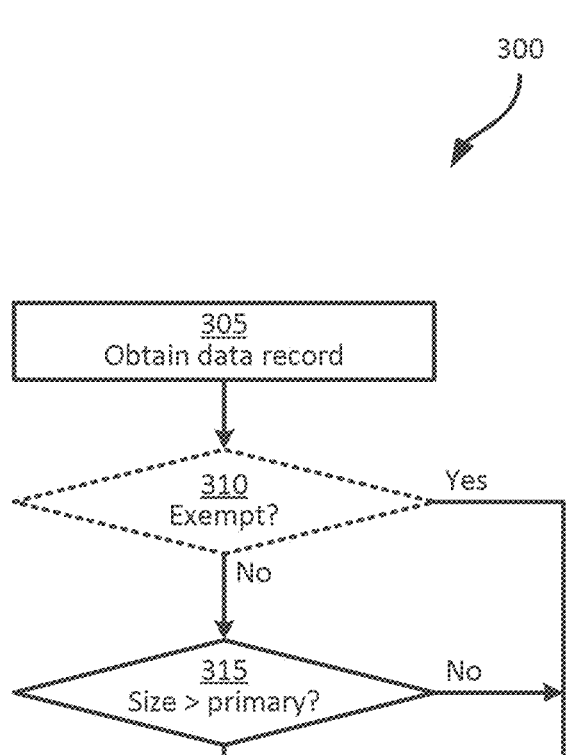
FIG. 3 is a flowchart of a method of overtruncating data logs.

Turning to FIG. 3, a method 300 for overtruncation of logged data records is illustrated. The method 300 will be described below in conjunction with its performance by the computing device 100, via execution of the logging application 124 by the processor 108.

At block 305, the computing device 100 is configured to obtain a data record, e.g., by receiving the data record via the communications interface 116, or by generating the data record locally via execution of the primary data handling application 120. For example, the computing device 100 can detect, via execution of the logging application 124, creation of a PNR, updating of a PNR, or the like.

At block 310, the computing device 100 can be configured to determine whether the data record obtained at block 305 is exempt from truncation. The reduction in storage space requirements for overtruncated data records at the repository 104 may permit certain data records to be stored in full, even if those data records exceed a primary truncation threshold. For example, the device 100 can store one or more exemption criteria in the memory 112, and can compare the data record from block 305 to the exemption criteria.

The exemption criteria can include data record types, e.g., indicated by keywords, commands, or the like, in the message body. For example, a data record indicating the creation of a new PNR may be exempt, while a data record indicating an update to a previously-created PNR may not be exempt. Other exemption criteria can correspond to data records generated by certain applications or computing devices, e.g., as indicated in the headers of the data records from block 305. In other examples, block 310 may be omitted, and the device 100 can proceed directly to block 315.

When the determination at block 310 is affirmative, truncation evaluations via blocks 315 and 320 can be bypassed, and the device 100 can instead proceed directly to block 325 and store the current data record in the repository 104. However, when block 310 is omitted, or when the determination at block 310 is negative, the computing device 100 proceeds to block 315.

At block 315, the computing device 100 is configured to determine whether an initial size of the data record from block 305 exceeds the primary threshold 216. The primary threshold 216 can be configured within the application 124, and can be set at any of a wide variety of sizes, depending on the particular context in which the application 124 is deployed. For example, the primary threshold 216 can be set at 64 KB, as noted earlier. More generally, the primary threshold can be set at a value that may encompass certain complete data records (e.g., such that some incoming data records will not be truncated, even when they are not exempt).

When the determination at block 315 is negative, the computing device 100 proceeds to block 325, bypassing truncation of the data record at block 320. That is, as with an affirmative determination at block 310, a negative determination at block 315 results in storage of the complete data record in the repository 104.

When the determination at block 315 is affirmative, however, the computing device 100 proceeds to block 320. At block 320, the computing device 100 is configured to overtruncate the data record from block 305. That is, rather than truncate the data record to the primary threshold 216 evaluated at block 315 (as shown in FIG. 2), the computing device 100 is configured to truncate the data record to a secondary size, smaller than the primary threshold 216. The secondary size can also be predetermined, e.g., as a configuration setting in the application 124. In some examples, the secondary size can be less than half of the primary threshold 216. For instance, for a primary threshold 216 of 64 KB, the secondary size can be set at 4 KB (e.g., one sixteenth of the primary threshold 216).

Truncation is performed at block 320 by discarding a terminal portion of the data record beyond the secondary size. That is, the data record is retained, starting with the header or any other element that begins the data record, and continuing until the secondary size is reached. The secondary size can be selected to be at least as large as the expected size of the header and/or metadata of the data records processed via the method 300, such that the terminal portion of the data record discarded at block 320 is likely to include some or all of a message payload, but is unlikely to include metadata, headers, or the like.

At block 325, the device 100 is configured to store the data record resulting from the performance of blocks 305 to 320 in the repository 104. That is, if the determination at block 310 was affirmative or the determination at block 315 was negative, at block 325 the device 100 is configured to store the complete data record in the repository 104. If the determination at block 310 was negative (or omitted), and the determination at block 315 was affirmative, however, at block 325 the computing device 100 is configured to store a truncated version of the original data record in the repository 104.

Figure 4:
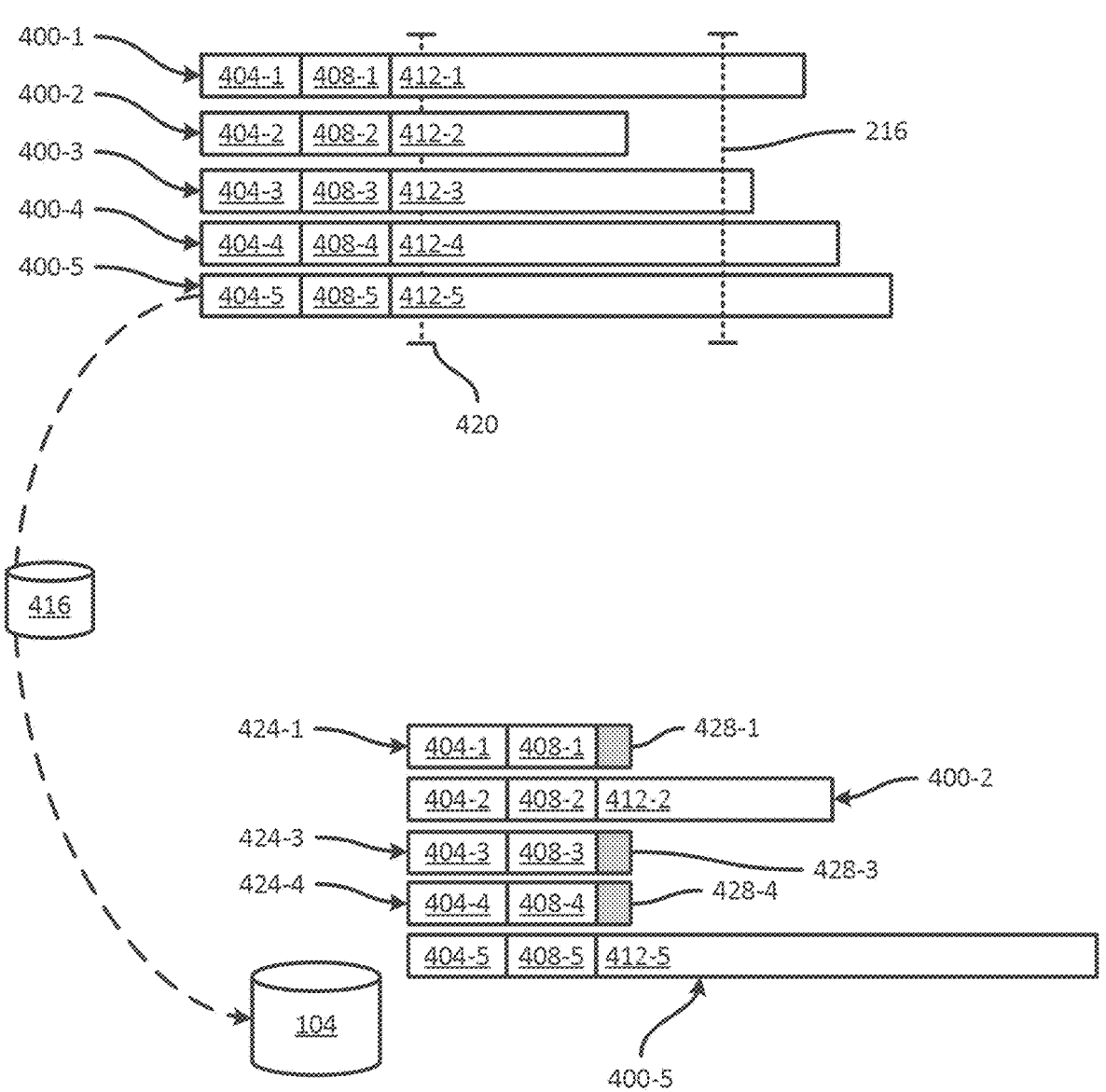
FIG. 4 is a diagram illustrated a data record overtruncation mechanism according to the method of FIG. 3.

Turning to FIG. 4, the results of example performances of the method 300 for five data records 400-1, 400-2, 400-3, 400-4, and 400-5 are shown. The records 400 include headers 404-1, 404-2, 404-3, 404-4, and 404-5, as well as bodies 408-1, 408-2, 408-3, 408-4, and 408-5 and payloads 412-1, 412-2, 412-3, 412-4, and 412-5. The primary threshold 216 applied at block 315 is the same as that discussed in connection with FIG. 2, e.g., at 64 KB.

The record 400-5 (e.g., with a size of about 90 KB), in this example, satisfies at least one of the exemption criteria 416 applied at block 310, and is therefore stored in full at the repository 104, despite being larger than the primary threshold 216. The other records 400 are not exempt, and are therefore processed via block 315. The record 400-2 is also stored in full, as the initial size of the record 400-2 (e.g., about 60 KB) does not exceed the primary threshold 216. Each of the records 400-1, 400-3, and 400-4, however, exceed the primary threshold 216.

Each of the records 400-1, 400-3, and 400-4 are therefore truncated, not according to the primary threshold 216, but according to a secondary size 420 smaller than the primary threshold 216. Via performances of block 325, the device 100 stores truncated records 424-1, 424-3, and 424-4 in the repository 104, each including the original header 404 and body 408, but a truncated payload 428-1, 428-3, or 428-4. The storage impact on the repository 104 is therefore reduced, relative to an implementation in which data records are truncated to the primary threshold 216, as shown in FIG. 2. Utility of the logged data records for diagnosis and other downstream activities, however, may be impacted little or not at all, due to the loss of utility of payload data for such activities when the payload data is truncated to any degree.

Those skilled in the art will appreciate that in some embodiments, the functionality implemented by the processor 108 via execution of the application 124 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A data logging method, comprising:
   obtaining, at a computing device configured to maintain a log repository corresponding to a plurality of data records, a data record among the plurality of data records, the obtained data record having an initial size;
   determining, at the computing device, whether the initial size exceeds a primary threshold;
   when the initial size exceeds the primary threshold,
   (i) generating a truncated data record by retaining header data of the obtained data record and discarding a terminal portion of the obtained data record that extends beyond a predetermined secondary size, wherein the predetermined secondary size is smaller than the primary threshold;
   (ii) storing the truncated data record in the log repository;
   when the initial size does not exceed the primary threshold, bypassing truncation of the obtained data record and storing the obtained data record in the log repository;

obtaining a second data record having a second initial size; and
   in response to determining that the second initial size does not exceed the primary threshold, storing the second data record in the log repository.

2. The method of claim 1,
   wherein the data record includes the header data and a payload; and
   wherein the predetermined secondary size is larger than the header data.

3. The method of claim 1, wherein the predetermined secondary size is less than one half of the primary threshold.

4. The method of claim 1, further comprising:
   prior to determining that the initial size exceeds a primary threshold, determining that the data record is not exempt from truncation.

5. The method of claim 4, wherein determining that the data record is not exempt from truncation includes:
   determining that at least one attribute of the data record fails to satisfy an exemption criterion.

6. A computing device, comprising:
   a memory to maintain a log repository corresponding to a plurality of data records;
   a communications interface; and
   a processor configured to:
   obtain a data record among the plurality of data records, the obtained data record having an initial size;
   determine whether the initial size exceeds a primary threshold;
   when the initial size exceeds the primary threshold,
   (i) generate a truncated data record by retaining header data of the obtained data record and discarding a terminal portion of the obtained data record that extends beyond a predetermined secondary size, wherein the predetermined secondary size is smaller than the primary threshold; and
   (ii) store the truncated data record in the log repository;
   when the initial size does not exceed the primary threshold, bypass truncation of the obtained data record and store the obtained data record in the log repository
   obtain a second data record having a second initial size; and
   in response to determining that the second initial size does not exceed the primary threshold, store the second data record in the log repository.

7. The computing device of claim 6,
   wherein the data record includes the header data and a payload; and
   wherein the predetermined secondary size is larger than the header data.

8. The computing device of claim 6, wherein the predetermined secondary size is less than one half of the primary threshold.

9. The computing device of claim 6, wherein the processor is further configured to:
   prior to determining that the initial size exceeds a primary threshold, determine that the data record is not exempt from truncation.

10. The computing device of claim 9, wherein the processor is configured to determine that the data record is not exempt from truncation by:
   determining that at least one attribute of the data record fails to satisfy an exemption criterion.

11. A non-transitory computer-readable medium storing a plurality of computer-readable instructions executable by a processor of a computing device configured to maintain a log repository corresponding to a plurality of data records, wherein execution of the instructions configures the computing device to:

obtain a data record among the plurality of data records, the obtained data record having an initial size;

determine whether the initial size exceeds a primary threshold;

when the initial size exceeds the primary threshold, (i) generate a truncated data record by retaining header data of the obtained data record and discarding a terminal portion of the obtained data record that extends beyond a predetermined secondary size, wherein the predetermined secondary size is smaller than the primary threshold; and (ii) store the truncated data record in the log repository;

when the initial size does not exceed the primary threshold, bypass truncation of the obtained data record and store the obtained data record in the log repository;

obtain a second data record having a second initial size; and in response to determining that the second initial size does not exceed the primary threshold, store the second data record in the log repository.

12. The non-transitory computer-readable medium of claim 11, wherein the data record includes the header data and a payload; and wherein the predetermined secondary size is larger than the header data.

13. The non-transitory computer-readable medium of claim 11, wherein the instructions are further executable by the processor to:

prior to determining that the initial size exceeds a primary threshold, determine that the data record is not exempt from truncation.

14. The non-transitory computer-readable medium of claim 13, wherein the instructions are further executable by the processor to determine that the data record is not exempt from truncation by:

determining that at least one attribute of the data record fails to satisfy an exemption criterion.

\* \* \* \* \*